(12) United States Patent
Xing et al.

(10) Patent No.: US 10,644,322 B2
(45) Date of Patent: May 5, 2020

(54) ELECTRODE MEMBER, ELECTRODE ASSEMBLY AND RECHARGEABLE BATTERY

(71) Applicant: Contemporary Amperex Technology Co., Limited, Ningde, Fujian Province (CN)

(72) Inventors: Chengyou Xing, Ningde (CN); Xiang Li, Ningde (CN); Taosheng Zhu, Ningde (CN); Peng Wang, Ningde (CN); Yulian Zheng, Ningde (CN)

(73) Assignee: Contemporary Amperex Technology Co., Limited (CN)

( * ) Notice: Subject to any disclaimer, the term of this patent is extended or adjusted under 35 U.S.C. 154(b) by 0 days.

(21) Appl. No.: 16/008,286

(22) Filed: Jun. 14, 2018

(65) Prior Publication Data
US 2019/0157684 A1 May 23, 2019

(30) Foreign Application Priority Data

Nov. 22, 2017 (CN) .......................... 2017 1 1172440

(51) Int. Cl.
*H01M 4/02* (2006.01)
*H01M 4/70* (2006.01)
(Continued)

(52) U.S. Cl.
CPC ............ *H01M 4/70* (2013.01); *H01M 2/266* (2013.01); *H01M 4/13* (2013.01); *H01M 4/667* (2013.01);
(Continued)

(58) Field of Classification Search
CPC ...................................................... H01M 4/02
See application file for complete search history.

(56) References Cited

U.S. PATENT DOCUMENTS

| 2005/0233209 A1 | 10/2005 | Sudano et al. |
| 2010/0119940 A1 | 5/2010 | Okano et al. |
| (Continued) | | |

FOREIGN PATENT DOCUMENTS

| JP | 2012185938 | 9/2012 |
| JP | 2013120780 A | 6/2013 |
| (Continued) | | |

*Primary Examiner* — Jacob B Marks
(74) *Attorney, Agent, or Firm* — Forge IP, PLLC

(57) ABSTRACT

The present disclosure relates to the technical field of rechargeable battery and, particularly, relates to an electrode member, an electrode assembly and a rechargeable battery. The electrode member includes an electrode body and a conduction structure, the electrode body comprises an insulation substrate and an conduction layer placed on a surface of the insulation substrate, the conduction layer includes a first portion and a second portion extending from the first portion, the first portion is coated with an active material while the second portion is not coated with the active material, and the conduction structure is connected to the second portion. After the electrode assembly is formed by winding or stacking of the electrode members, adjacent current guide portions are electrically connected to one another by the conduction structure, without being limited by the insulation substrate, so that the conductivity of the electrode member is effectively improved.

9 Claims, 8 Drawing Sheets

(51) Int. Cl.
*H01M 2/26* (2006.01)
*H01M 4/66* (2006.01)
*H01M 10/04* (2006.01)
*H01M 4/13* (2010.01)
*H01M 10/052* (2010.01)

(52) U.S. Cl.
CPC .......... *H01M 10/0431* (2013.01); *H01M 2/26* (2013.01); *H01M 10/052* (2013.01)

(56) References Cited

U.S. PATENT DOCUMENTS

2014/0349181 A1    11/2014  Lim et al.
2015/0171462 A1*  6/2015  Hong ................ H01M 10/0436
                                                          429/1

FOREIGN PATENT DOCUMENTS

| JP | 2013187077 A | 9/2013 |
|----|----|----|
| JP | 2015513183 A | 4/2015 |
| WO | WO2012093588 A1 | 7/2012 |
| WO | WO2015037560 A1 | 3/2015 |

\* cited by examiner

United States Patent US 10,644,322 B2

ELECTRODE MEMBER, ELECTRODE ASSEMBLY AND RECHARGEABLE BATTERY

CROSS-REFERENCE TO RELATED APPLICATIONS

The present application claims priority to Chinese Patent Application No. 201711172440.5, filed on Nov. 22, 2017, the content of which is incorporated herein by reference in its entirety.

TECHNICAL FIELD

The present application relates to the technical field of rechargeable batteries and, particularly, relates to an electrode member, an electrode assembly and a rechargeable battery.

BACKGROUND

A lithium ion battery is a rechargeable battery and has advantages of high energy density, high power density, long cycle life and long storage life, etc., and thus is widely applied in portable electronic devices such as cell phones and notebook PCs, and electric transportation vehicles such as electric vehicles and electric bicycles.

An electrode member of the lithium ion battery is generally made of metal material, for example, the positive electrode member is generally made of aluminum foil and the negative electrode member is generally made of copper foil. However, the aluminum foil (or copper foil) readily forms burrs when being punctured by the nail in the nailing test, and the burrs directly lap on the negative electrode member (or the positive electrode member), which results in internal short circuit in the positive electrode member and the negative electrode member, causing fire or explosion of the lithium ion battery.

SUMMARY

In a first aspect, the present disclosure provides an electrode assembly, including an electrode body, wherein the electrode body includes an insulation substrate and a conduction layer provided on a surface of the insulation substrate, wherein the conduction layer includes a first portion and a second portion extending from the first portion, wherein the first portion is coated with an active material and the second portion is not coated with the active material; and a conduction structure, wherein the conduction structure is connected to the second portion.

Optionally, the conduction layer is provided on two opposite side surfaces of the insulation substrate, the conduction structure includes a first conduction element, and the first conduction element is connected to the second portion located on one of the two opposite side surfaces of the insulation substrate.

Optionally, the conduction structure further includes a second conduction element, and the second conduction element is connected to the second portion located on the other one of the two opposite side surfaces of the insulation substrate.

Optionally, the first conduction element is directly connected to the second conduction element; or the conduction structure further includes a conductive connection portion and the conductive connection portion is connected between the first conduction element and the second conduction element.

Optionally, an end of the conduction structure away from the first portion extends beyond an end of the second portion away from the first portion.

Optionally, the second portion has a width greater than that of the conduction structure.

Optionally, the conduction structure and the second portion are welded to each other to form a first welding portion there between, wherein the first welding portion is located at an end of the second portion close to the first portion.

Optionally, the second portion includes a body portion and a transition portion, wherein the transition portion is located between the body portion and the first portion, and the transition portion has a width greater than that of the body portion.

Optionally, the conduction structure includes a body connection portion and a transition connection portion, wherein the transition connection portion is located at an end of the body connection portion close to the first portion, and the transition connection portion has a width greater than that of the body connection portion.

Optionally, the body connection portion is connected to the body portion, and/or the transition connection portion is connected to the transition portion.

In a second aspect, the present disclosure provides an electrode assembly, including the electrode member according to any of the above.

Optionally, a portion of the insulation substrate corresponding to the second portion and the second portion cooperatively form a current guide portion; the number of the current guide portion is more than one, and the number of the conduction structure is more than one; the more than one current guide portions and the more than one conduction structures are stacked up in a manner in which at least one of the one or more conduction structures are arranged between every two adjacent current guide portions of the more than one current guide portions.

In a third aspect, the present disclosure provides a rechargeable battery including a current collection member and the electrode assembly as mentioned above, wherein the electrode member of the electrode assembly is electrically connected to the current collection member by the conduction structure.

In the present disclosure, a conduction structure is added into the electrode member having an insulation substrate, and the conduction structure is connected to the second portion uncoated with any active material, so that every two adjacent current guide portions can be electrically connected by the current guide portion after the electrode members are winded or stacked to form the electrode assembly, without being subject to restriction of the insulation substrate, thereby effectively improving conduction capability of the electrode member.

BRIEF DESCRIPTION OF DRAWINGS

In order to more clearly describe the technical solutions in the embodiments of the present application or in the related art, the accompanying drawings for describing the embodiments or the related art are briefly introduced as follows. The drawings in the following description merely illustrate some embodiments of the present application, and those skilled in the art can derive other drawings from these without creative efforts

REFERENCE SIGNS

Figure 1:
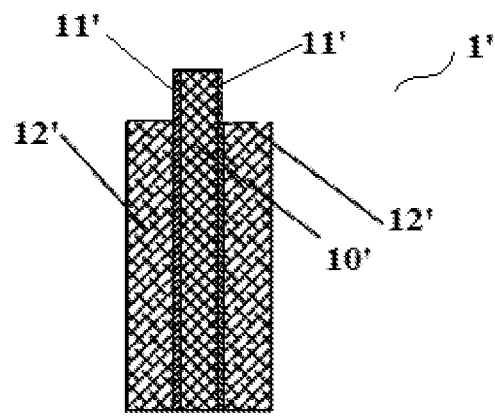
FIG. 1 illustrates a structural schematic diagram of an electrode member containing an insulation substrate.

1'—electrode member; 10'—insulation substrate; 11'—conduction layer; 12'—active material; 13'—current guide portion; 14'—electricity generation portion;

1—electrode body; 10—insulation substrate; 11—conduction layer; 12—active material; 13—current guide portion; 14—electricity generation portion;

2—conduction structure; 21a—first conduction element; 21b—second conduction element; 22—conductive connection portion;

1a—first welding portion; 1b—second welding portion; 1c—rivet; 1d—third welding portion; 13a—body portion; 13b—transition portion; 2a—body connection portion; 2b—transition connection portion; G—gap;

100—electrode assembly; 101—negative electrode member; 102—separator; 103—positive electrode member; 200—current collection member; 300—top cover; 400—electrode terminal.

DESCRIPTION OF EMBODIMENTS

The technical solutions of the present application are clearly and completely described as follows with reference to the accompanying drawings. The described embodiments are merely a part of the embodiments of the present application rather than all of the embodiments. The following description is merely exemplary and illustrative, which is not intended to constitute any limit to the present application. Based on these exemplary embodiments, all other embodiments obtained by those skilled in the art without any creative work shall fall into the protection scope of the present application.

Related techniques, methods and devices known to those skilled in the art may not be described in detail in the context. However, in suitable cases, those related techniques, methods and devices shall be considered as a part of the specification.

In the context of the present application, orientations and locations indicated by orientation terms such as front, back, upper, lower, left, right, transverse, longitudinal, vertical, horizontal, top and bottom, are generally described based on the orientation or location shown in the drawings, which are merely used for convenient description of the present application. These orientation terms are not intended to indicate or imply that the related device or element must have a specific orientation or is constructed or operated in a specific direction, unless otherwise noted, and therefore shall not be considered as limit to the protection scope of the present application. Beside, orientation terms "internal, external, inner and outer" are merely described in relation to an outline of a related element itself.

In the description of the present application, the terms "first", "second", etc., are used to conveniently distinguish related elements, that is, these terms themselves have no particular meaning, unless otherwise noted, and thus shall not be considered as limit to the protection scope of the present application.

Figure 2:
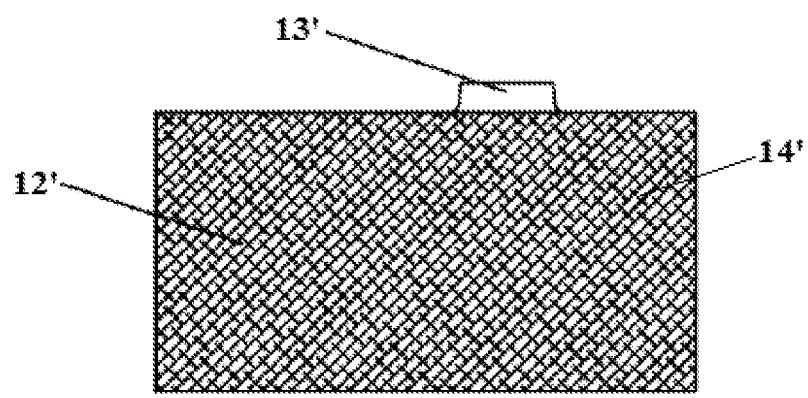
FIG. 2 is a side view of FIG. 1.

In order to solve the problem in the nailing testing, the present application provides an electrode member without using the aluminum or copper foil. As shown in FIGS. 1-2, the electrode member 1' includes an insulation substrate 10' and a conduction layer 11' provided on an surface of the insulation substrate 10'. The conduction layer 11' includes a first portion coated with an active material and a second portion uncoated with any active material, and the second portion extends from the first portion. For convenient description, the first portion together with a part of the insulation substrate 10' corresponding to the first portion is referred to as an electricity generation portion 14', and the second portion together with another part of the insulation substrate 10' corresponding to the second portion is referred to as a current guide portion 13'. During use, the active material in the electricity generation portion 14' reacts chemically with the electrolyte solution so that a charge and discharge process is formed. The current guide portion 13' is connected to a current collecting member, which directs the generated current outside. Since the conduction layer 11' is provided on the surface of the insulation substrate 10' and has a thickness far smaller than that of a copper or aluminum foil, no burr will formed in the nailing test and the nail test can be passed safely.

However, a plurality of current guide portions 13' will be formed when such electrode members are winded or stacked to form an electrode assembly. The plurality of current guide portions 13' are connected to the current collecting member. Because of the presence of the insulation substrate 10', the conduction layer 11' among the plurality of current guide portions 13' cannot directly contact one another and results in poor conduction performance (even mutual insulation), which causes overgreat resistance at the connection between the current guide portions 13' and the current collector, and rapid temperature rise in the charge and discharge process.

In view of the above, embodiments of the present disclosure provides an electrode member.

For facilitating understanding, a basic configuration of a rechargeable battery is firstly illustrated with reference to FIG. 5 and FIG. 6. As shown in FIG. 6, the rechargeable battery substantially includes a housing (not shown in the figures), an electrode assembly 100, a current collection member 200, a top cover 300, and an electrode terminal 400. The housing defines a cavity with an opening at the top. The cavity is used to accommodate and protect the electrode assembly 100, etc. The electrode assembly 100 is contained in the housing and serves as a core component for realizing the charge-discharge function of the rechargeable battery. The top cover 300 covers the opening of the housing. The electrode terminal 400 is arranged on the top cover 300 and is exposed out of the top cover 300. The current collection member 200 is connected between the electrode assembly 100 and the electrode terminal 400, for realizing an electrical connection between the electrode assembly 100 and the electrode terminal 400.

Figure 5:
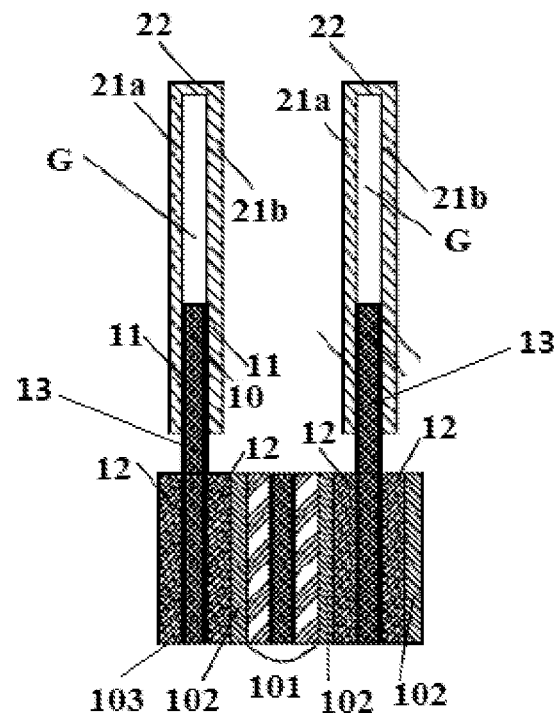
FIG. 5 illustrates a locally exploded diagram of an electrode assembly based on the electrode member shown in FIG. 3.
Figure 6:
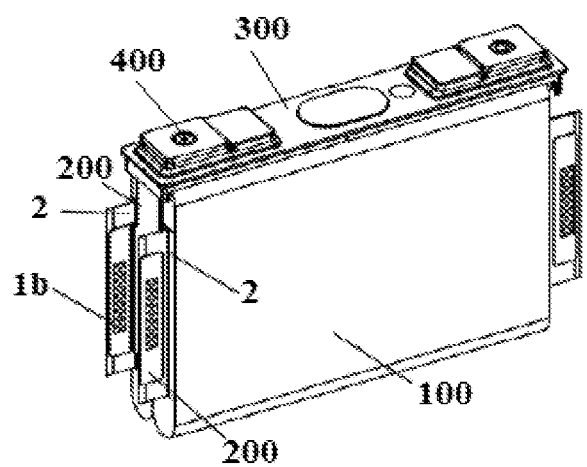
FIG. 6 illustrates a perspective diagram of a battery based on the electrode assembly shown in FIG. 5.

As shown in FIG. 5, the electrode assembly 100 is formed by winding and stacking a positive electrode member 103, a negative electrode member 101, a separator 102 between the positive electrode member 103 and the negative electrode member 101. The positive electrode member 103 and the negative electrode member 101 are generally sheet-like structures, and therefore are usually called positive electrode plate and negative electrode plate. The positive electrode member 103 and the negative electrode member 101 each include an electricity generation portion 14 and a current guide portion 13. The electricity generation portion 14 contains an active material 12, while the current guide portion 13 does not contain an active material 12. After the electrode assembly is formed by winding or stacking, the current guide portions 13 of the electrode assembly are stacked together to respectively form a positive electrode tab and a negative electrode tab. The electrode assembly is connected to the current collection member 200 by the positive electrode tab or the negative electrode tab. The positive electrode member 103 corresponds to the positive electrode tab. The negative electrode member 101 corresponds to the negative electrode tab. The electrode terminal 400 connected to the positive electrode tab by the current collection member 200 is called as a positive electrode terminal. The electrode terminal 400 connected to the negative electrode tab by the current collection member 200 is called as a negative electrode terminal.

When an electrode assembly 100 is formed by winding or stacking an existing electrode member shown in FIGS. 1-2 as the positive electrode member 103 and/or the negative electrode member 101, any two adjacent current guide portions 13 of the electrode tab of the electrode assembly 100 are separated by an insulation substrate 10', therefore, it is difficult or even impossible to transport current between the two adjacent current guide portions 13, and the current can only be transported outwards by merely a conduction layer 11' of an outermost current guide portion 13 of the tab, wherein the conduction layer 11' is directly connected to the current collection member 200. Therefore, the conduction performance is poor, and charge-discharge efficiency is low and local overheat readily occurs, which shortens the service life of the components.

In order to solve the above-mentioned problem, the present application modifies the electrode member including insulation substrate shown in FIGS. 1-2, and provides a new electrode member.

FIGS. 3-11 illustrate five embodiments of the electrode member according to the present application. As shown in FIGS. 3-11, the electrode member includes an electrode body 1 and a conduction structure 2. The electrode body 1 includes an insulation substrate 10 and a conduction layer 11 placed on a surface of the insulation substrate 10. The conduction layer 11 includes a first portion and a second portion extending from the first portion, the first portion is coated with an active material 12, and the second portion is not coated with an active material 12. The conduction structure 2 is connected to the second portion.

For convenient description, the first portion and a part of the insulation substrate 10 corresponding to the first portion together are called as an electricity generation portion 14, and the second portion and a part of the insulation substrate 10 corresponding to the second portion together are called as a current guide portion 13. In other words, in the present application, the electrode body 1 includes an electricity generation portion 14 and a current guide portion 13, and each of the electricity generation portion 14 and the current guide portion 13 includes an insulation substrate 10 and a conduction layer 11 placed on a surface of the insulation substrate 10, and the conduction layer 11 of the electricity generation portion 14 is coated with the active material 12 while the conduction layer 11 of the current guide portion 13 is not coated with an active material 12. The electricity generation portion 14 is used to realize the charge and discharge processes upon an electrochemical reaction of the active material 12 with the electrolyte solution. The current guide portion 13 is used to be connected to the current collection member 200 of the rechargeable battery, for leading the current generated by the electricity generation portion 14 outside.

In the present invention, after the electrode assembly 100 is formed by winding or stacking the electrode members, adjacent current guide portions 13 are realized to be electrically connected to one another by the conduction structure 2 in such a manner that the conduction structure 2 is further added in the electrode member having the insulation substrate 10 and the conduction structure 2 is connected to the second portion placed on the insulation substrate 10, without being restricted by the insulation substrate 10, thereby effectively enhancing electric conductivity of the electrode member.

In a further embodiment, the conduction layer 11 may be placed on a side surface of the insulation substrate 10, or on two opposite side surfaces of the insulation substrate 10. When the conduction layer 11 is placed on the two opposite side surfaces of the insulation substrate 10, the conduction structure 2 may include a first conduction element 21a. The first conduction element 21a is connected to the second portion located on one side surface of the insulation substrate 10; or, the conduction structure 2 may meantime further include a second conduction element 21b, and the second conduction element 21b is connected to the second portion located on the other side surface of the insulation substrate 10. The first conduction element 21a and the second conduction element 21b may have the same or different configuration and material.

When the conduction structure 2 includes both the first conduction element 21a and the second conduction element 21b, the first conduction element 21a may be directly connected to the second conduction element 21b, or, the conduction structure 2 may further include a conductive connection portion 22 connected between the first conduction element 21a and the second conduction element 21b, so that the first conduction element 21a is connected to the second conduction element 21b by the conductive connection portion 22.

Hereinafter, the present application is further illustrated with reference to the five embodiments shown in FIGS. 3-11. In the five embodiments shown in FIGS. 3-11, the electrode assemblies 100 each are formed by winding the electrode members for example.

Figure 3:
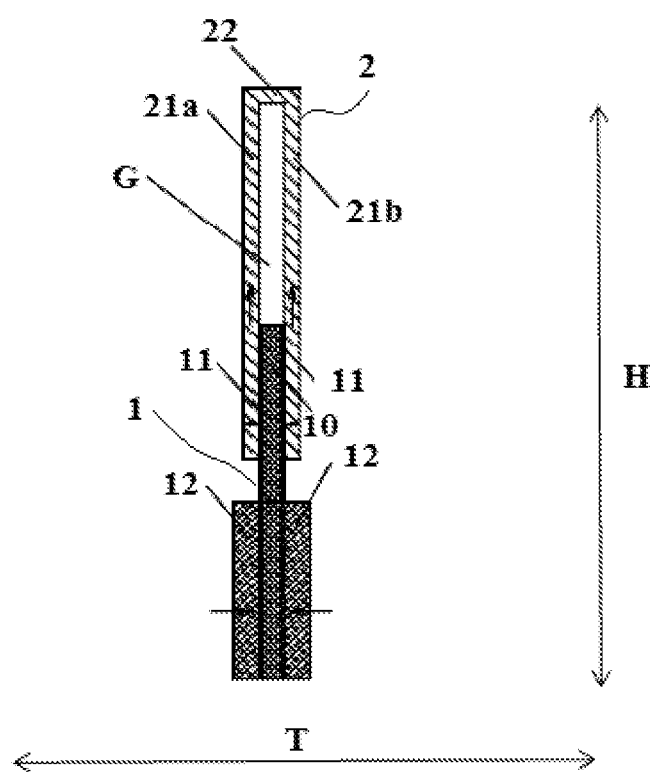
FIG. 3 illustrates a structural schematic diagram of an electrode member according to a first embodiment of the present application.
Figure 4:
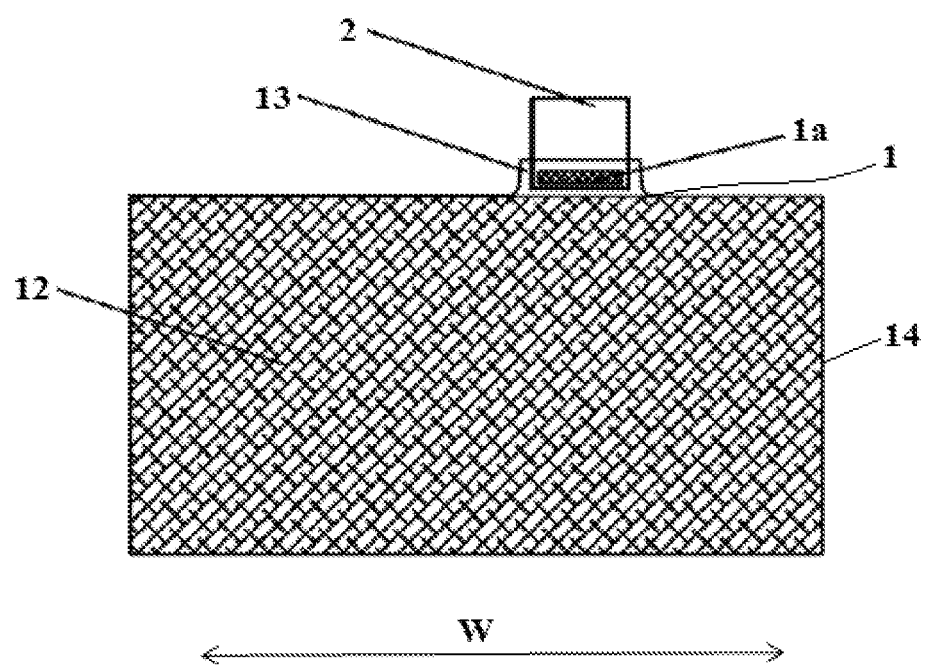
FIG. 4 is a side view of FIG. 3.

The first embodiment of the present application is illustrated with reference to FIGS. 3-5. FIG. 3 and FIG. 4 show the electrode member in the first embodiment, and FIG. 5 and FIG. 6 show an electrode assembly and a rechargeable battery based on the electrode member of the first embodiment, respectively.

In the first embodiment shown in FIG. 3 and FIG. 4, the electrode member includes an electrode body 1 and a conduction structure 2. The electrode body 1 includes an insulation substrate 10 and a conduction layer 11. The insulation substrate 10 may be made of a macromolecule polymer material such as PP, PE, PET or PI, which is resistant against corrosion of the electrolyte solution. The conduction layer 11 may be made of metal material such as aluminum or copper. Preferably, the conduction layer 11 is made of aluminum material when the electrode member is used as a positive electrode member, and the conduction layer 11 is made of copper material when the electrode member is used as a negative electrode member. The conduction structure 2 may be made of metal material such as copper or aluminum. Preferably, the conduction structure 2 is made of aluminum material when the electrode member is used as a positive electrode member, and conduction structure 2 is made of copper material when the electrode member is used as a negative electrode member.

In the embodiment shown in FIG. 3 and FIG. 4, the conduction layer 11 is placed on two opposite side surfaces of the insulation substrate 10, i.e., the two opposite side surfaces of the insulation substrate 10 each are provided with one conduction layer 11 and the insulation substrate 10 is located between two conduction layers 11. The conduction layer 11 includes a first portion coated with an active material 12 (i.e., the lower portion in FIG. 3) and a second portion not coated with an active material 12 (i.e., the upper portion in FIG. 3), and the second portion extends from the first portion (i.e., extending upwards in FIG. 3). The conduction layer 11 may be formed on the surface of insulation substrate 10 by electroplating, electrophoresis, spraying, or dip coating, etc.

For convenient description, direction T shown in FIG. 3 is referred to as a thickness direction, the thickness direction T is a direction along which the two opposite side surfaces of the insulation substrate 10 on which the conduction layers 11 are placed, i.e., the two conduction layers 11 are placed on the two opposite side surfaces of the insulation substrate 10 along the thickness direction in the present embodiment. Direction H shown in FIG. 3 is referred to as a height direction, and the height direction H is a relative arrangement direction of the first portion with respect to the second portion, i.e., a relative extending direction of the first portion and the second portion. Direction W shown in FIG. 4 is referred to as a width direction and the width direction W is a direction perpendicular to the thickness direction T and the height direction H.

In the embodiment shown in FIG. 3, the conduction structure 2 is connected to the second portion, in other words, the conduction structure 2 is connected to the conduction layer 11 of the current guide portion 13. Based on this, the electrode member can realize current exportation by a connection between the conduction structure 2 and the current collection member 200 rather than by a direct connection between the conduction layer 11 and the current collection member 200, which effectively improves the conduction performance of the electrode member. The arrow shown in FIG. 3 indicates the output direction of the current. As indicated by the arrow in FIG. 3, the current flows from the active material 12 through the first portion of the conduction layer 11 toward the second portion of the conduction layer 11, then flows through the second portion of the conduction layer 11 toward the conduction structure 2 connected to the second portion, so that the conduction structure 2 directs the current to the current collection member 200 of the rechargeable battery connected to the conduction structure 2, and then the current is directed outwards by the current collection member 200, for example, to the electrode terminal 400 of the rechargeable battery.

The conduction structure 2 may be welded or adhered to the second portion, for example, the conduction structure 2 may be connected to the second portion by ultrasonic welding or conductive adhesive bonding. In an embodiment shown in FIG. 4, the conduction structure 2 is welded to the second portion, and a first welding portion 1a is formed between the conduction structure 2 and the second portion. If a root portion of the current guide portion 13a is excessively soft, it will be easy for the current guide portion 13a to be bent and inserted into an interior of the electrode assembly 100, causing short circuit. In order to solve such problem, as shown in FIG. 4, the first welding portion 1a is placed at an end of the second portion close to the first portion, that is, the first welding portion 1a is located at the root portion of the second portion, i.e., the conduction structure 2 is welded to the root portion of the current guide portion 13. The first welding portion 1a has a certain degree of strength, and thus, the closer the first welding portion 1a to the root portion of the second portion, the greater the strength of the root of the current guide portion 13, thereby avoiding short circuit caused by a soft root portion of the current guide portion 13 being bent and inserted into the interior of the electrode assembly 100, thus effectively improving safety performance during use.

Further, as shown in FIG. 3, the conduction structure 2 includes a first conduction element 21a and a second conduction element 21b. The first conduction element 21a and the second conduction element 21b are placed at two sides of the current guide portion 13 along the thickness direction of the current guide portion 13, respectively; and the first conduction element 21a and the second conduction element 21b are connected to the two conduction layers 11 on the two side surfaces of the insulation substrate 10 of the current guide portion 13, respectively. That is, the first conduction element 21a is connected to the second portion on one side surface of the insulation substrate 10, and the second conduction element 21b is connected to the second portion on the other side surface of the insulation substrate 10.

Because of the first conduction element 21a and the second conduction element 21b on the two sides of the current guide portion 13 in the thickness direction of the current guide portion 13, as shown in FIG. 5, a conduction structure 2 is placed between any two adjacent current guide portions 13 of the electrode tab (positive electrode tab or negative electrode tab) of the electrode assembly 100 including the electrode member, and any two adjacent current guide portions 13 can be electrically connected to one another by the first conduction element 21a of one of the two current guide portions 13 and the second conduction element 21b of the other one of the two current guide portions 13, such that the current can be successfully and sufficiently transported through the stacked current guide portions 13 of the electrode tab and, finally, the current generated by the electrode assembly 100 is completely and efficiently transported to current collection member 200. Since the current transportation between the current guide portions 13 of the electrode tab would not be blocked by the insulation substrate 10, then the charge-discharge efficiency of rechargeable battery is effectively improved and the overheat risk of the rechargeable battery during charge/discharge is effectively reduced, which is beneficial for extending the service life of the rechargeable battery.

In the present embodiment, the first conduction element 21a and the second conduction element 21b are placed on two opposite sides of the current guide portion 13 along the thickness direction of the current guide portion 13, respectively, such that, as shown in FIG. 3, a gap G is formed between the first conduction element 21a and the second conduction element 21b. Further, both an upper end of the first conduction element 21a and an upper end of the second conduction element 21b are higher than an upper end of the current guide portion 13, that is, in the height direction H, an edge of the conduction structure 2 away from the first portion extends beyond an edge of the second portion away from the first portion, such that the electrode body 1 (i.e., the current guide portion 13) is merely filled in a part of the gap G between the first conduction element 21a and the second conduction element 21b.

The electrode body 1 is merely filled in a portion of the gap G between the first conduction element 21a and the second conduction element 21b, and at least a portion of the first conduction element 21a is not separated from at least a portion of the second conduction element 21b by the insulation substrate 10 along the height direction H, therefore, on the one hand, it is beneficial to achieve electrical connection between the two conduction layers 11 respectively on the two side surfaces of the insulation substrate 10 along the thickness direction of the insulation substrate 10 by the first conduction element 21a and the second conduction element 21b, thereby further facilitating current extraction and improving the conduction performance; on the other hand, during connecting the electrode assembly 100 formed by the electrode member to the current collection member 200 of the rechargeable battery, the gap G can be reduced by pressing tight the first conduction element 21a and the second conduction element 21b to make the first conduction element 21a and the second conduction element 21b be laminated tightly, which not only facilitates the electrode tab to transport the current on the stacked current guide portions 13 to the current collection member 200, but also further improves the conduction capability while reducing the assembling spaced occupied by the electrode tab, increasing space utilization of the electrode assembly 100, and facilitating the assembling of the electrode assembly 100 and the current collection member 200.

Further, in the embodiment shown in FIG. 3, the conduction structure 2 further includes a conductive connection portion 22. The conductive connection portion 22 is connected between the first conduction element 21a and the second conduction element 21b. As shown in FIG. 3, a lower end of the first conduction element 21a and a lower end of the second conduction element 21b are connected to the second portions on opposite side surfaces of the insulation substrate 10 in the thickness direction of the insulation substrate 10, respectively; and the upper end of the first conduction element 21a is connected to the upper end of the second conduction element 21b by the conductive connection portion 22, such that the conduction structure 2 is substantially shown as an inverted U shape and connected to the current guide portion 13.

By using the conductive connection portion 22, the first conduction element 21a and the second conduction element 21b are connected together. Therefore, the current can be transported between the first conduction element 21a and the second conduction element 21b, even if the first conduction element 21a and the second conduction element 21b are not pressed tight. Thus, the electrical connection between adjacent current guide portions 13 will not be adversely influenced by the insulation substrate 10 after the electrode assembly 100 is formed, which further improves the conduction performance of the electrode tab.

In addition to that the first conduction element 21a and the second conduction element 21b are indirectly connected together by using the conductive connection portion 22, the first conduction element 21a may be directly connected to the second conduction element 21b, that is, an end of the first conduction element 21a away from the first portion (i.e., the upper end in FIG. 3) may be directly connected to an end of the second conduction element 21b away from the first portion (i.e., the upper end in FIG. 3). For example, a copper or aluminum foil may be used as the conduction structure 2, the copper foil or an aluminum foil is bent from the middle into two opposite portions, and the two portions are connected to the conduction layers 11 on the opposite sides the current guide portion 13, respectively. In this case, the two opposite portions of the copper or aluminum foil formed after bending are the first conduction element 21a and the second conduction element 21b, respectively. Accordingly, the first conduction element 21a and the second conduction element 21b are directly connected to each other to form an inverted V-shape structure, such that the conduction structure 2 is substantially shown as an inverted V-shape structure connected to the current guide portion 13.

In another embodiment shown in FIG. 4, a size of the second portion is greater than a size of the conduction structure 2 in the width direction W, that is, the width of the second portion is greater than the width of the conduction structure 2. Thus, the current guide portion 13 has a relatively great cross-sectional area, small resistance and great current flow capability.

In an embodiment, the electrode member is used as the positive electrode member 103, and the electrode member, the separator 102 and the negative electrode member 101 are winded together, for example, to form the electrode assembly 100 shown in FIG. 5. As shown in FIG. 5, the electrode assembly 100 includes a plurality of current guide portions 13 and a plurality of conduction structures 2, the current guide portions 13 are stacked up, and a conduction structure 2 is placed between every two adjacent current guide portions 13. The stacked current guide portions 13 form the electrode tab of the electrode assembly 100. Due to the conduction structure 2 between every two adjacent current guide portions 13, the adjacent current guide portions 13 can be electrically connected to one another by the conduction structures 2, without being limited by the insulation substrate 10. Accordingly, during extraction of the current generated by the electricity generation portion 14, not only the outermost current guide portions 13 of the electrode tab directly connected to the current collection member 200 can transport the current outwards through the conduction structure 2, but also the other stacked current guide portions 13 between the outermost current guide portions 13 can be electrically connected to one another and transport the current outwards by the conduction structures 2, thereby effectively improving conduction performance and achieving more efficient charge/discharge.

In the electrode assembly 100 shown in FIG. 5, the positive electrode member 103 adopts the electrode member of the above-mentioned embodiment, while the negative electrode member 101 does not adopt the electrode member of the above-mentioned embodiment. In an embodiment, the negative electrode member 101 may adopt the electrode member of the above-mentioned embodiment while the positive electrode member 103 may not adopt the electrode member of the above-mentioned embodiment, or, both the positive electrode member 103 and the negative electrode member 101 adopt the electrode member of the above-mentioned embodiment. In fact, the electrode member according to the embodiments of the present disclosure can be used as either the positive electrode member 103 or the negative electrode member 101, that is, the positive electrode member 103 and/or the negative electrode member 101 of the electrode assembly 100 can adopt the electrode member of the present disclosure.

The rechargeable battery shown in FIG. 6 can be formed by assembling the electrode assembly 100 in FIG. 5 and the current collection member 200, housing, top cover 300 and electrode terminal 400 of the rechargeable battery. The electrode assembly 100 may be welded (for example, ultrasonic welding or resistance welding) or threaded to the current collection member 200, so as to realize the electrical connection between the electrode assembly 100 and the current collection member 200. For example, in the embodiment shown in FIG. 6, the electrode assembly 100 is welded to the current collection member 200. For example, the electrode assembly 100 is welded to the current collection member 200 by the conduction structure 2, and a second welding portion 1b is formed between the conduction structure 2 and the current collection member 200.

Another four embodiments of the present disclosure are illustrated below. In order to simplify the description, merely the differences of the four embodiments from the first embodiment above are illustrated, and the part which is not described can be understood with reference to the first embodiment.

Figure 7:
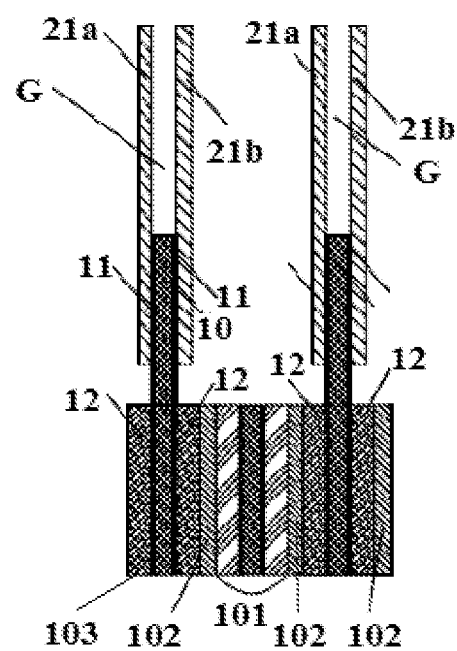
FIG. 7 illustrates an electrode member and an electrode assembly based on the electrode member according to a second embodiment of the present application.

FIG. 7 illustrates an electrode member of a second embodiment of the present disclosure. As shown in FIG. 7, the conduction structure 2 also includes the first conduction element 21a and the second conduction element 21b, and the upper end of the conduction structure 2 (i.e., the end away from the second portion) extends beyond the upper end of the second portion (i.e., the end away from the second portion). The difference from the first embodiment includes: the conduction structure 2 of the second embodiment is no longer connected to the conductive connection portion 22 between the first conduction element 21a and the second conduction element 21b, that is, the upper end of the first conduction element 21a is not connected to the upper end of the second conduction element 21b by the conductive connection portion 22, and both the upper end of the first conduction element 21a and the upper end of the second conduction element 21b are free ends independent from one another. Since the conductive connection portion 22 is eliminated, the first conduction element 21a and the second conduction element 21b are no longer supported by the conductive connection portion 22, the first conduction element 21a and the second conduction element 21b can get much closer to each other under a foreign force. Therefore, when connecting the electrode assembly 100 to the current collection member 200, the first conduction element 21a and the second conduction element 21b of the respective conduction structures 2 can be more tightly pressed fit, so that the gap G between first conduction element 21a and the second conduction element 21b can be effectively removed, thereby further improving conductivity, saving assembling space, and realizing more efficient assembling of the electrode assembly 100 and the current collection member 200.

Figure 8:
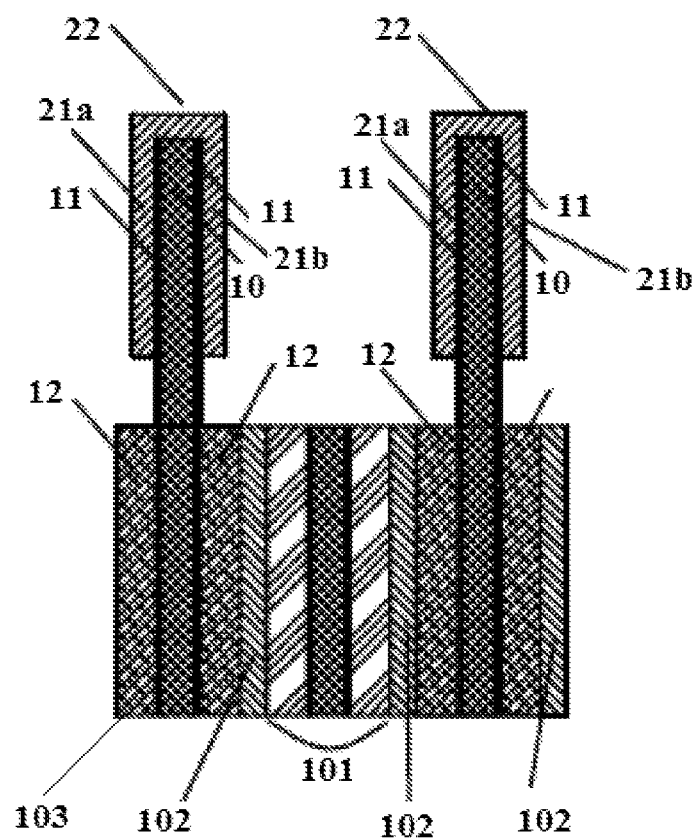
FIG. 8 illustrates an electrode member and an electrode assembly based on the electrode member according to a third embodiment of the present application.

FIG. 8 illustrates an electrode member according to a third embodiment of the present embodiment. As shown in FIG. 8, the conduction structure 2 of the third embodiment also includes the first conduction element 21a, the second conduction element 21b, and a conductive connection portion 22 connected between the first conduction element 21a and the second conduction element 21b. The difference from the first embodiment includes: along the height direction H, the electrode body 1 (specifically, the current guide portion 13) is filled in the entire gap G between the first conduction element 21a and the second conduction element 21b rather than in a part of the gap G. Such setting at least has the following beneficial effects: the electrode body 1 can support the entire first conduction element 21a and the entire second conduction element 21b along the height direction H, so that bending of the first conduction element 21a and the second conduction element 21b can be effectively prevented. Therefore, on the one hand, the strength of the electrode member is increased, on the other hand, the short circuit caused by bending and inserting of the first conduction element 21a and the second conduction element 21b into electrode assembly 100 during use can be prevented, thereby further improving safety performance.

Figure 9:
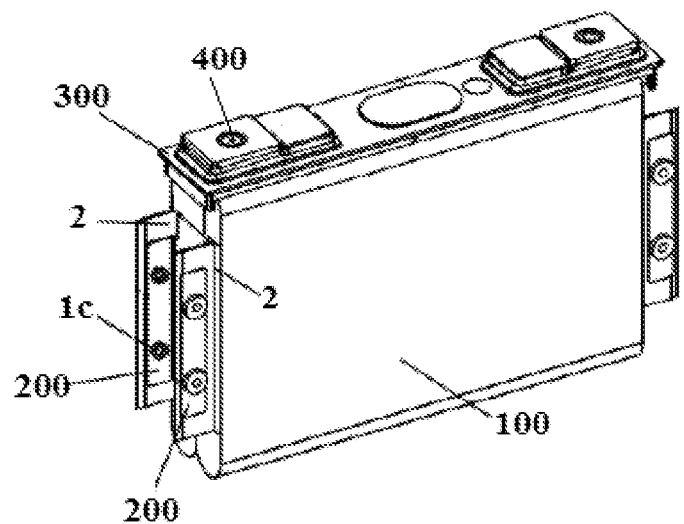
FIG. 9 illustrates an electrode member and an electrode assembly based on the electrode member according to a fourth embodiment of the present application.

The electrode assembly 100 formed based on the electrode member of the third embodiment shown in FIG. 8 may be threaded or riveted to the current collection member 200 of a rechargeable battery. For example, as shown in FIG. 9, the conduction structure 2 may be connected to the current collection member 200 by using a rivet 1c. It is much easier for threaded connections such as the rivet 1c to penetrate through the conduction structure 2, and the insulation substrate 10 and conduction layer 11 filled between the first conduction element 21a and the second conduction element 21b, further simplifying the connection. In addition, since the threaded connection such as the rivet 1c penetrates through the current guide portion 13, the conduction layers 11 on the two side surfaces of the current guide portion 13 (i.e., the second portions on the two side surfaces of the insulation substrate 10) can be electrically connected to one another, which can further improve the conduction capability of the electrode member according to the third embodiment.

Figure 10:
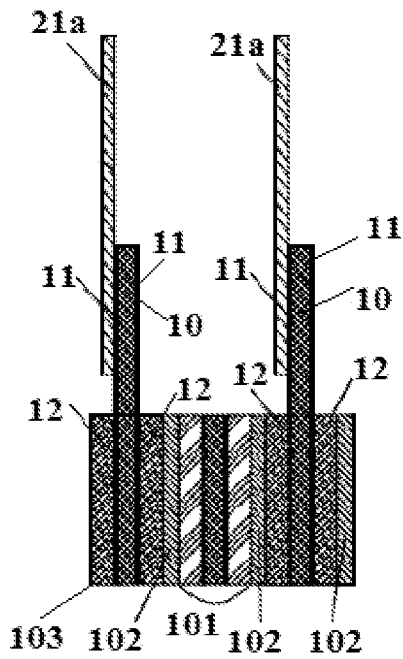
FIG. 10 illustrates a perspective diagram of a battery based on the electrode assembly shown in FIG. 9.

FIG. 10 illustrates an electrode member according to a fourth embodiment of the present disclosure. As shown in FIG. 10, the upper end of the conduction structure 2 of the fourth embodiment also extends beyond the upper end of the second portion. The difference from the first embodiment includes: the second conduction element 21b and the conductive connection portion 22 are removed from the conduction structure 2 of the fourth embodiment, that is, the conduction structure 2 includes only the first conduction element 21a, rather than including all of the first conduction element 21a, the second conduction element 21b, and the conductive connection portion 22; in other words, the conduction element of the fourth embodiment is provided on the second portion of only one side surface of the insulation substrate 10 along the thickness direction of the insulation substrate 10, rather than on the second portions of both two opposite side surfaces of the insulation substrate 10 along the thickness direction of the insulation substrate 10. In addition, as shown in FIG. 10, in an electrode assembly 100 formed by winding the electrode members of the fourth embodiment, the first conduction element 21a of each electrode member is located on the respective second portion of the same side surface of the respective insulation substrate 10 along the respective thickness direction of the respective insulation substrate 10. As such, in the stacked current guide portions 13a shown in FIG. 10, the conduction structure 2 (i.e., the first conduction element 21a) is present between every two adjacent current guide portions 13, and the conduction layer 11 on the side of one current guide portion 13 without the first conduction element 21a (e.g., the conduction layer 11 on the left side of the current guide portion 13 on the left side of FIG. 9) can contact with the first conduction element 21a of another adjacent current guide portion 13 (e.g., the first conduction element 21a on the left side of the current guide portion 13 on the right side of FIG. 9), thereby realizing the electrical connection between any two adjacent current guide portions 13 of the electrode tab and effectively extracting the electricity. Further, since the second conduction element 21b and the conductive connection portion 22 are removed in the fourth embodiment, the size of the conduction structure 2 along the thickness direction T can be effectively reduced while providing sufficient current flow, which not only further reduces the space occupied by the electrode tab during assembling and increases space utilization of the electrode assembly 100, but also reduces the difficulties in assembling other structural components of the electrode assembly 100 and the rechargeable battery.

Figure 11:
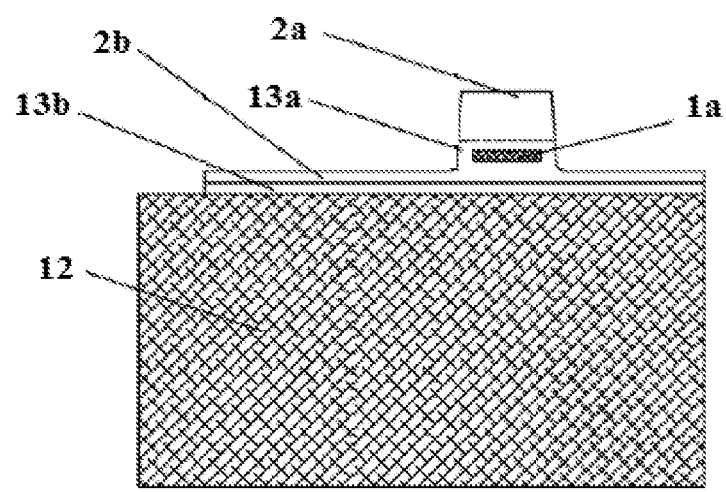
FIG. 11 illustrates a side view of an electrode member according to a fifth embodiment of the present application.

FIG. 11 illustrates an electrode member according to a fifth embodiment of the present disclosure. In the fifth embodiment shown in FIG. 11, the second portion of the conduction layer 11 uncoated with an active material 12 includes a body portion 13a and a transition portion 13b. The transition portion 13b is located between the body portion 13a and the first portion, and a width of the transition portion 13b is greater than a width of the body portion 13a. By providing the transition portion 13b whose width is greater than the width of the body portion 13a based on the presence of the body portion 13a, the current guide portion 13a has an increased area, a reduced resistance, and an increased current flow capability. The transition portion 13b and the body portion 13a may be made of the same material. Further, as shown in FIG. 11, the width of the transition portion 13b in the fifth embodiment may be smaller than the width of the first portion so that a short circuit can be prevented from forming between the transition portion 13b and the electrode member of the electrode assembly 100 with an opposite polarity to the transition portion 13. For example, in an instance in which the electrode member of the fifth embodiment is used as the positive electrode member 103, a short circuit can be prevented from forming between the transition portion 13b and the negative electrode member 101 if the transition portion 13b has a smaller width than the first portion; or in another instance in which the electrode member is used as the negative electrode member 101, a short circuit can be prevented from forming between the transition portion 13b and the positive electrode member 103 if the transition portion 13b has a smaller width than the first portion. Thus, the safety performance is further improved.

Further, in the fifth embodiment shown in FIG. 11, the conduction structure 2 includes a body connection portion 2a and a transition connection portion 2b. The transition connection portion 2b is located at an end of the body connection portion 2a close to the first portion, and a width of the transition connection portion 2b is greater than a width of the body connection portion 2a. In a case when the conduction structure 2 includes the first conduction element 21a and/or the second conduction element 21b, as in the preceding four embodiments, the body connection portion 2a and the transition connection portion 2b are the upper portion and the lower portion of the first conduction element 21a and/or second conduction element 21b, respectively. In addition, in the fifth embodiment shown in FIG. 11, the body connection portion 2a is connected to the body portion 13a, and the transition connection portion 2b is connected to the transition portion 13b. By connecting the transition connection portion 2b to the transition portion 13b, the conduction structure 2 is connected to the transition portion 13b of the second portion with a relatively great width by the transition connection portion 2b having a relatively greater width, which increases the contact area between the conduction structure 2 and the current guide portion 13, increases the flow area of the conduction structure 2 and the second portion, and further improves conductivity. Further in the fifth embodiment shown in FIG. 11, an lower edge of the transition connection portion 2b is located above an lower edge of the transition portion 13b, and an edge of the transition connection portion 2b along a width direction of the transition connection portion 2b does not extend beyond the a width direction of the transition portion 13b along the width direction of the transition portion 13b. Therefore, the transition connection portion 2b does not contact with the active material 12, and it will be difficult for a short circuit to form between the transition connection portion 2b and the electrode member of the electrode assembly 100 with an opposite polarity to the transition connection portion 2b, thereby achieving better safety performance.

The above are merely exemplary embodiments of the present disclosure, which are not used to limit the present disclosure. Any amendment, equivalent substitution, or improvement made to the present disclosure within the principles of the present disclosure shall fall into the protection scope of the present disclosure.

What is claimed is:

1. An electrode assembly, comprising a plurality of electrode members,
each of the plurality of electrode members comprising:
an electrode body, wherein the electrode body comprises an insulation substrate and a conduction layer provided on each of two opposite side surfaces of the insulation substrate, wherein the conduction layer comprises a first portion and a second portion extending from the first portion, wherein the first portion is coated with an active material and the second portion is not coated with the active material; and
a conduction structure, wherein the conduction structure is connected to the second portion, and the conduction structure comprises a first conduction element and a second conduction element,
wherein the first conduction element is connected to the second portion located on one of the two opposite side surfaces of the insulation substrate, the second conduction element is connected to the second portion located on the other one of the two opposite side surfaces of the insulation substrate, and the conduction structure and the second portion are welded to each other,
a portion of the insulation substrate corresponding to the second portion and the second portion form one current guide portion, a plurality of current guide portions of the plurality of electrode members is stacked, and the first conduction element and the second conduction element are arranged between every two adjacent guide portions of the plurality of current guide portions.

2. The electrode assembly according to claim 1, wherein the first conduction element is directly connected to the second conduction element; or the conduction structure further comprises a conductive connection portion and the conductive connection portion is connected between the first conduction element and the second conduction element.

3. The electrode assembly according to claim 1, wherein an end of the conduction structure away from the first portion extends beyond an end of the second portion away from the first portion.

4. The electrode assembly according to claim 1, wherein a width of the second portion is greater than a width of the conduction structure.

5. The electrode assembly according to claim 1, wherein the conduction structure and the second portion that are welded to each other form a first welding portion there between, wherein the first welding portion is located at an end of the second portion close to the first portion.

6. The electrode assembly according to claim 1, wherein the second portion comprises a body portion and a transition portion, wherein the transition portion is located between the body portion and the first portion, and a width of the transition portion is greater than a width of the body portion.

7. The electrode assembly according to claim 6, wherein the conduction structure comprises a body connection portion and a transition connection portion, wherein the transition connection portion is located at an end of the body connection portion close to the first portion, and a width of the transition connection portion is greater than a width of the body connection portion.

8. The electrode assembly according to claim 7, wherein the body connection portion is connected to the body portion, and/or the transition connection portion is connected to the transition portion.

9. A rechargeable battery, comprising:
 a current collection member, and
 the electrode assembly according to claim 1, wherein the electrode member of the electrode assembly is electrically connected to the current collection member by the conduction structure.

* * * * *